May 3, 1949.  I. P. RODMAN, JR  2,469,130
METHOD OF AND APPARATUS FOR MOLDING
Filed Oct. 17, 1945
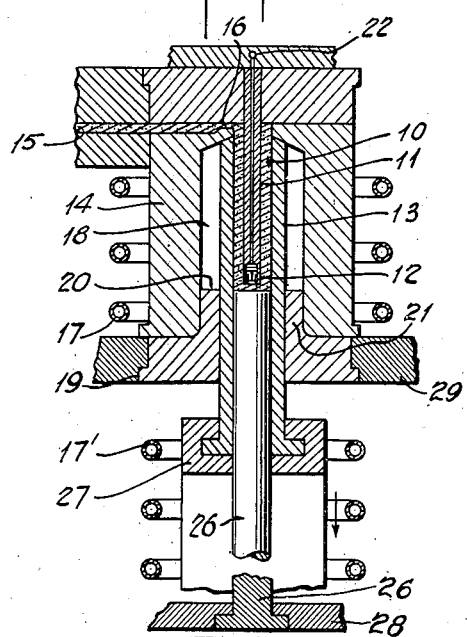
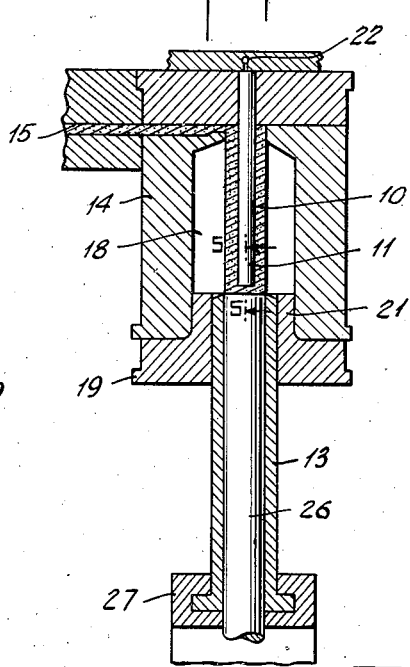
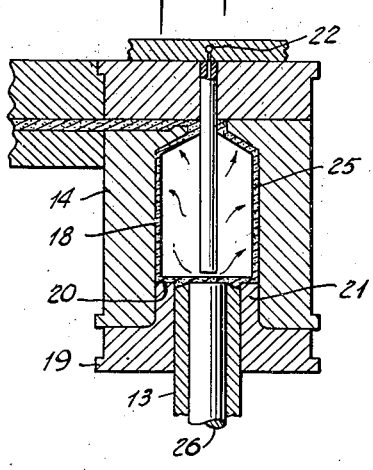
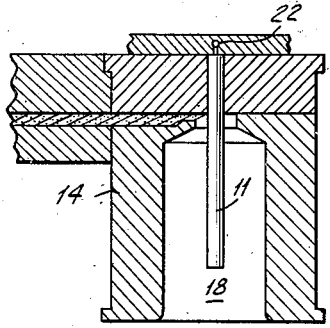
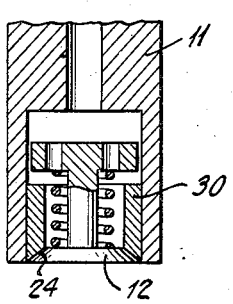
INVENTOR
I. P. RODMAN JR.
BY
ATTORNEY Patented May 3, 1949

2,469,130

UNITED STATES PATENT OFFICE 2,469,130

METHOD OF AND APPARATUS FOR MOLDING

Isaac P. Rodman, Jr., West Orange, N. J., assignor to Celluplastic Corporation, Newark, N. J., a corporation of New Jersey Application October 17, 1945, Serial No. 622,710

10 Claims. (Cl. 18—5)

This invention is directed to the molding of plastic materials by a novel method and apparatus.

In methods heretofore proposed in this art for molding tubular objects, it has been necessary to use preforms and split molds, and special non-automatic equipment. By means of my invention objects may be molded in fully automatic machines. It will be apparent to those skilled in this art that the attainment of said objectives by the method and apparatus of my invention, permitting the use of fully automatic machines, represents a distinct and valuable advance in the art.

The foregoing and other advantageous objects, which will appear from the description hereinafter, are accomplished by a method and apparatus illustrated in the accompanying drawings, in which:

Fig. 1 is a vertical, transverse sectional view of a mold embodying my invention showing the first step of my process, which consists in flowing the plastic material within a sleeve and around a mandrel disposed within the mold, Fig. 2 is a similar view, showing the position of the parts in the second step of my process, that is, on retraction of the sleeve from the cavity, Fig. 3 is a similar view, showing the position of the parts in the third step of my process, in which the blank of plastic material is expanded against the walls of the cavity, Fig. 4 shows the position of the parts in the fourth step of my process, in which the apparatus on which the completed article is positioned, together with the completed article, is withdrawn from the mold cavity, and Fig. 5 is a fragmentary enlarged sectional view of the mandrel check valve taken at line 5—5 of Fig. 2.

As shown in Fig. 1 of the drawings, the first step of the process of my invention consists in flowing a blank 10 of plastic material in the form of a generally closed tube within a retractable sleeve 13 (which at one end abuts the cavity 18 and closes the same) around the mandrel 11 and on the retractable plunger 26. The plunger 26 is disposed within and closes the other end of the sleeve adjacent the end of the mandrel, the latter containing a check valve 12. The sleeve 13 is telescopically arranged with respect to the mandrel to define therewith a tubular chamber to receive plastic material. The parts referred to are disposed within the cavity block 14, the plastic material being introduced in any desired or conventional manner, as through the runner 15 and gate 16 terminating in the blank 10. The cavity block 14 may be provided with any desired or convenient heat exchange means, such as conventionally indicated at 17 in Fig. 1. Additional or other heat exchange means such as indicated at 17' of Fig. 1 may be provided throughout the apparatus as desired. The heat exchange means may, as shown at 17, 17', be a water system used for heating or cooling purposes, depending on the plastic material used, and on the cycle of operation and other factors well known in this art. It will be understood that the mold may be a multiple cavity mold comprising a group of units such as that shown in Fig. 1, arranged in a manner which will be obvious to those skilled in this art; likewise the mechanism for feeding plastic material to the runner 15, as through a sprue medially arranged with respect to the units of the machine, may be any conventional or desired means such as are well known in this art. The cavity block 14 is shown as being of an injection molding type; any other method of supplying the material to the mold suited for use with the apparatus and process described herein may be used in carrying out the invention, within the purview of the invention.

The blank 10 is initially formed as shown in Fig. 1 by injection or otherwise flowing the plastic material through the runner 15 in a free-flowing, near-liquid mass; the blank 10 if of a thermoplastic material is cooled sufficiently to attain stability of form.

When the blank has attained stability of form, that is, when it possesses sufficient shear strength so that the outside walls of the blank will not tend to tear on withdrawal of the sleeve 13, the latter is withdrawn from the cavity 18 as by means of bar 27 to a position substantially flush with the upper edge 20 of the reduced portion 21 of the bottom force part 19 which is adapted to be received within the cavity block 14 to close the bottom thereof. The "stability of form" of the blank 10 on withdrawal of sleeve 13 from the cavity 18 referred to above is that state at which the blank is in a semiplastic form, viz: approximately the temperature at which plastic material leaves an extrusion die, which for the more common forms of injection molding material ranges from 250° F. to 350° F. at the date of filing this application.

The third step of my process consists of the introduction of an expansion medium into the blank 10, through the mandrel 11, as for example the introduction of compressed air or other gas or expansion means from an external source 22. The check valve 12 normally closes the mandrel to prevent the plastic material from flowing into the mandrel. The expansion medium 22 is introduced into the mandrel in the third step of my process as shown in Fig. 3 at sufficient pressure to force the check valve 12 off its seat 24 at the lower end of the mandrel, the compressed air flowing into the blank 10 and expanding the same uniformly against the walls 18 of the mold cavity to define the general form of the bottle or other object 25 to be molded. The check valve 12 may be pressure urged to penetrate slightly into the plastic material adjacent the end of mandrel 11, or the plunger 26 may be slightly withdrawn away from the valve end of the mandrel to facilitate the discharge of the expansion medium through the valve end of the mandrel. The cavity block 14 may then be temperature controlled by heat exchange system 17 to harden the completed object 25 as is common in this art.

The fourth step of my invention is illustrated in Fig. 4 and consists of the ejection of the completed object 25 from the mold by withdrawing the sleeve 13, plunger 26 and bottom force part 19 from the mold; by continuing the air pressure through the mandrel, object 25 will be broken from the gate 16 and will move out of cavity 18 on the parts 13, 19 and 26. Any suitable or supplementary expedient may be resorted to in aid of the removal of object 25.

The sleeve 13 may be of any desired cross section, as may also the mandrel 11; the latter may be of such outline as desired to regulate the wall thicknesses of the finished article; the mandrel should be nowhere larger than at the neck of the bottle, so as to permit withdrawal of the latter.

The four steps above referred to are the only ones necessary in carrying out the molding operations pursuant to my invention. The mold 14 then may be opened in the usual manner on the parting line thereof far enough for the runners 15 and sprue to be ejected.

The sleeve 13 may be of any desired uniform cross-section. The mandrel check valve may be of any desired construction which normally closes the mandrel responsive to external pressure and permits opening the valve responsive to internal pressure. The precise pressure required to open the valve is readily determined according to the respective dimensions of the parts and all other pertinent factors. In Fig. 5 there is illustrated one of many possible forms of the check valve 12 wherein the seat 24 thereof is shown formed on a member 30 secured interiorly of the end of the mandrel 11. In the steps of my process illustrated in Figs. 1 and 2 the external pressure of the plastic material of blank 10 forces the valve 12 to a closed position. The mandrel valve 12 is displaced from its seat 24 when air pressure is introduced with the mandrel in the third and fourth steps of my process (see Figs. 3 and 4).

The broad principles of the invention are referred to above. It will be apparent to those skilled in the art that many conventional expedients, such as rotatable bushings to form an externally threaded neck, or the rotating of a threaded mandrel for an internally threaded neck in the finished article 25 may be employed in carrying out the invention.

The objects formed by the method and apparatus above set forth do not have a parting line such as they would have if formed in the split molds proposed heretofore for molding bottles.

The carrying out of my invention does not require costly special equipment; conventional molding machines may be used, provided with the apparatus and operated in accordance with the method of my invention. The invention permits the molding of objects on fast cycles in completely automatic multiple cavity molding machines with all conditions controlled.

Any suitable means generally designated in Fig. 1 as members 28 and 29 engaging members 26 and 19 respectively to reciprocate the latter in unison or independently relatively to member 14 may be provided; the members 19, 13 and 26 may be retracted or reciprocated relative to the member 14 selectively or in unison as desired in carrying out my invention as above set forth.

Having thus described my invention, what I claim as new and desire to secure by Letters Patent, is:

1. The method of molding plastic objects which consists in flowing plastic material within a sleeve and around a mandrel and on a plunger positioned within a mold cavity, a bottom force part in which said sleeve is slidably disposed, said force part defining the bottom of said cavity, to define a plastic blank, displacing the sleeve from the mold cavity, and introducing an expansion medium through the mandrel into the blank, expanding the latter against the walls of the cavity to define the object to be molded, and withdrawing the sleeve, force part and plunger while continuing the introduction of the expansion medium, thus removing said object from the mold cavity.

2. In an apparatus for molding plastic objects in a mold having a cavity, a bottom part and plunger received within the lower end of the cavity to close the same, a sleeve slidably arranged in said bottom part, means to reciprocate said sleeve, plunger and bottom part relative to said cavity, a mandrel positioned in said mold and projecting medially into said sleeve when the latter is positioned in the mold means to supply a fluid to said mandrel, whereby plastic material may be flowed into said sleeve around the mandrel to define a plastic blank, and the sleeve may be withdrawn from the cavity, and the fluid may be introduced from said mandrel into the blank to expand the blank against the walls of the cavity when the sleeve is withdrawn from the cavity to define the object to be molded.

3. In an apparatus for molding plastic objects in a mold having a cavity, a bottom part and plunger received within the lower end of the cavity to close the same, a sleeve slidably arranged in said bottom part, means to reciprocate said sleeve, plunger and bottom part relative to said cavity, a mandrel positioned in said mold and projecting medially into said sleeve when the latter is positioned in the mold, whereby plastic material may be flowed into said sleeve around the mandrel to define a plastic blank, and the sleeve may be withdrawn from the cavity.

4. The method of forming hollow articles from organic plastic material in a mold comprising a closed mold cavity the lower end of said cavity being defined by a force part and a retractable sleeve slidably disposed in said force part, a tubular mandrel extending into the sleeve and spaced therefrom to form a closed initial blank-forming space, which method comprises flowing plastic material into the initial blank-forming space, until the blank-forming space is filled with the plastic material, thereby molding a starting blank enclosing the tubular mandrel, allowing the plastic blank to remain in the molding space until the said plastic material becomes partly self-sustaining, retracting the retractable sleeve from the still plastic blank while leaving the blank still surrounding the mandrel and expanding the resulting blank by applying a fluid pressure medium to the interior of the blank through the tubular mandrel to effect such expansion while holding the blank against longitudinal movement relative to the mold cavity as it is expanded therein, and thereafter expelling the resulting molded article from the mold cavity by further withdrawing the sleeve and force part completely from the mold cavity while continuing introduction of the pressure medium into the molded article.

5. The method of forming hollow articles from plastic materials in a mold comprising a closed mold cavity, the lower end of said cavity being defined by a force part and a retractable sleeve slidably disposed in said force part forming a closure for said cavity, and a tubular mandrel extending into the sleeve and spaced therefrom to form an initial blank-forming space, which method comprises injecting a stream of the plastic material in fluid condition into the blank-forming space until the space is filled with the plastic material to produce a starting blank, allowing the resulting initial, plastic blank to become self-sustaining but still in plastic condition, enlarging the initial blank-forming space after the initial starting blank has become self-sustaining into a mold cavity, expanding the initial blank into final shape by admitting a fluid pressure medium into the said blank thereby expanding the blank laterally into finished shape, and then withdrawing the sleeve and force part and ejecting the expanded article from the mold cavity by continued admission of the fluid pressure medium.

6. The method of forming hollow articles from plastic material which comprises providing a closed mold having a cavity therein of an internal configuration corresponding to the shape of the article to be molded, providing in the said mold cavity means defining a closed, substantially cylindrical die space, introducing fluid plastic material to be molded into the cylindrical die space, until the space is filled with the material, allowing the plastic material to become self-sustaining in the said space while maintaining the said space constant in its dimensions, thereby forming a substantially cylindrical, but plastic starting blank, removing the cylindrical die space means die parts from around the starting blank while maintaining the starting blank in initial position, expanding the blank laterally while restraining the blank longitudinally by introducing a fluid medium into the blank until the expanded blank fills the mold cavity, restraining a portion of the cylindrical blank at an end thereof while expanding the remaining portion of the blank into engagement with the sides of the mold cavity, and after expansion of the article in the mold cavity, effecting release of the resulting expanded article from the mold cavity by opening the bottom portion of the mold while continuing introduction of the fluid medium into the expanded article under sufficient pressure to effect ejection of the expanded article from the mold cavity.

7. An apparatus for molding articles composed of plastic materials by injection molding, which comprises, in combination, an injection mold provided with a mold cavity having a configuration corresponding to the article to be molded, a tubular mandrel extending into the mold cavity, a retractable sleeve extending longitudinally axially through the mold cavity and enclosing the tubular mandrel in spaced relation thereto, the sleeve defining an initial forming die around the mandrel, a plunger in the sleeve, a reciprocable force part forming an end closure for the mold cavity and surrounding the retractable sleeve, means for injecting plastic material into the initial forming die for producing an expansible initial blank of the material, means for retracting the sleeve from around the mandrel and the initial blank of plastic material and means for introducing compressed expansion fluid through the mandrel into the blank for expanding the blank laterally into engagement with the walls of the mold cavity, the said force part being adapted to be withdrawn from the cavity during continued application of the pressure fluid into the expanded shape to thereby eject the expanded shape from the mold cavity.

8. An apparatus for molding articles composed of plastic materials by molding, which comprises, in combination, a molding block having a mold cavity therein, the walls of which have a contour defining the shape of a finished molded article, a retractable sleeve having an end abutting the mold cavity and closing the same, a tubular mandrel extending through the mold block into the tubular sleeve, a retractable plunger in the sleeve forming a closure for the sleeve adjacent the end of the mandrel, the sleeve being telescopically arranged with respect to the mandrel to define therewith a tubular chamber to receive plastic material, means for supplying fluid plastic material to the tubular chamber, means for telescoping the sleeve relative to the mandrel for withdrawing the sleeve from around an initially molded blank of the plastic material, means for introducing an expansion medium through the tubular mandrel into the molded blank for laterally expanding the blank against the walls of the mold cavity, means including a bottom force part for the mold cavity and the said end of the sleeve for restraining the blank from longitudinal movement during expansion thereof, and means for withdrawing the force part, plunger and sleeve entirely from the mold cavity, whereby, upon continued application of expansion medium into the expanded article, the said article is ejected from the mold onto the force part, sleeve and plunger and thereby released from the mold.

9. An apparatus for molding articles composed of plastic materials by molding, which comprises, in combination, a mold comprising a mold block provided with a mold cavity having a configuration corresponding to the article to be molded, a tubular mandrel extending into the mold cavity, and defining with the mold block a cylindrical space adapted to form the upper end of the article to be molded, a retractable sleeve extending longitudinally axially through the mold cavity, and enclosing the tubular mandrel in spaced relation thereto, the mold cavity tapering at its inner end to the cylindrical space to define a tapering portion end of the molded article, the said sleeve when in closed position defining an initial forming die around the mandrel, a plunger in the sleeve, movable relative thereto, a reciprocable force part forming an end closure for the mold cavity and surrounding the retractable sleeve, means for injecting plastic material into the forming die for producing an expansible initial blank of the material, means for retracting the sleeve from around the mandrel and the initial blank of plastic material, and means for introducing compressed expansion fluid through the mandrel into the blank for expanding the blank laterally into engagement with the walls of the mold cavity, the said force part restraining the blank against longitudinal movement during lateral expansion thereof, whereby, that portion of the blank in the cylindrical space between the mandrel and the mold blank is restrained against expansion to form the molded article, and means for withdrawing the force part completely from the mold cavity after lateral expansion of the blank, whereby, upon continued application of the compressed expansion fluid, the molded article is released from the mold.

10. The method of molding plastic objects, which consists in flowing plastic material within a sleeve and around a mandrel and on a plunger positioned within a mold cavity the lower end of said cavity being defined by a force part in which the sleeve is slidably disposed, to define a plastic blank, displacing the sleeve from the mold cavity longitudinally axially thereof, introducing an expansion medium through the mandrel into the blank, expanding the latter against the walls of the cavity to define the object to be molded, and withdrawing the force part, sleeve and plunger completely from the mold cavity while continuing introduction of the expansion medium, thereby removing the resulting molded object longitudinally from the mold cavity through the resulting open end thereof.

ISAAC P. RODMAN, Jr.

REFERENCES CITED

The following references are of record in the file of this patent:

UNITED STATES PATENTS

| Number | Name | Date |
|---|---|---|
| 484,131 | Atterbury | Oct. 11, 1892 |
| 598,224 | Hays | Feb. 1, 1898 |
| 2,331,688 | Hobson | Oct. 12, 1943 |

FOREIGN PATENTS

| Number | Country | Date |
|---|---|---|
| 327,225 | France | Mar. 18, 1903 |

OTHER REFERENCES

Modern Plastics, by Leo D. Felton, May, 1941, 18—I. M. Dig. (pages 77 and 102).